(12) United States Patent
Honda

(10) Patent No.: US 12,149,665 B2
(45) Date of Patent: Nov. 19, 2024

(54) IMAGE READING APPARATUS AND COMPUTER-READABLE STORAGE MEDIUM

(71) Applicant: CANON KABUSHIKI KAISHA, Tokyo (JP)

(72) Inventor: Norikazu Honda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/480,447

(22) Filed: Oct. 3, 2023

(65) Prior Publication Data

US 2024/0137452 A1 Apr. 25, 2024

(30) Foreign Application Priority Data

Oct. 13, 2022 (JP) .................. 2022-165018
Aug. 2, 2023 (JP) .................. 2023-126438

(51) Int. Cl.
*H04N 1/10* (2006.01)
*H04N 1/12* (2006.01)
*H04N 1/195* (2006.01)

(52) U.S. Cl.
CPC ......... *H04N 1/1043* (2013.01); *H04N 1/1035* (2013.01); *H04N 1/12* (2013.01); *H04N 1/195* (2013.01); *H04N 2201/0094* (2013.01)

(58) Field of Classification Search
CPC ...... H04N 1/1043; H04N 1/1035; H04N 1/12; H04N 1/195; H04N 2201/0094; H04N 1/121; H04N 1/0057; H04N 1/00602; H04N 1/193; H04N 1/2032; H04N 1/00013; H04N 1/00031; H04N 1/00045; H04N 1/0005; H04N 1/00063; H04N 1/00087; H04N 1/00572; H04N 1/00578; H04N 1/0058; H04N 1/00588; H04N 1/0062; H04N 1/00628; H04N 1/00631; H04N 1/00649; H04N 1/00652; H04N 1/00657; H04N 1/0464; H04N 1/1225; H04N 1/123; H04N 1/1235; H04N 1/125; H04N 2201/0081;
(Continued)

(56) References Cited

U.S. PATENT DOCUMENTS 6,377,360 B1 * 4/2002 Hattori ................ H04N 1/0461
358/296
7,782,498 B2 * 8/2010 Hoshi ................ H04N 1/00708
399/376

(Continued)

FOREIGN PATENT DOCUMENTS

JP H05-284284 10/1993

*Primary Examiner* — Negussie Worku
(74) *Attorney, Agent, or Firm* — Venable LLP

(57) ABSTRACT

An image reading apparatus, comprising an image reading unit configured to perform image reading, a drive unit configured to move a target in the image reading, and a signal generating unit configured to generate a signal for driving the image reading unit, the image reading apparatus configured to acquire, with moving the target by the drive unit, image data by the image reading unit performing the image reading based on a signal generated by the signal generating unit, wherein the drive unit moves the target such that the target changes at a speed according to a predetermined driving speed profile, and the signal generating unit generates a signal, based on the driving speed profile, at a timing making the moving distance of the target to be an equal interval.

11 Claims, 12 Drawing Sheets

(58) Field of Classification Search
CPC ..... H04N 2201/044; H04N 2201/0454; H04N 2201/0462; H04N 1/00018; H04N 1/00612; H04N 1/028; H04N 1/0402; H04N 1/0414; H04N 1/0443; H04N 1/0455; H04N 1/1013; H04N 1/19; H04N 2201/0091; G03G 15/602; G03G 15/50; G03G 2215/00198; B65H 2801/39; B65H 5/26; B65H 2301/44516; B65H 2404/63; B65H 2404/632; B65H 29/6609; B65H 5/24; B65H 5/38; G03B 27/526; G03B 27/625

See application file for complete search history.

(56) References Cited

U.S. PATENT DOCUMENTS

| | | | | |
|---|---|---|---|---|
| 8,469,471 | B2* | 6/2013 | Kikuchi | B41J 2/17546 347/14 |
| 10,015,325 | B2 | 7/2018 | Honda | H04N 1/00037 |
| 10,554,844 | B2* | 2/2020 | Hosogoshi | H04N 1/4076 |
| 11,647,142 | B2* | 5/2023 | Yanagiwara | H04N 1/00822 358/408 |
| 2002/0080420 | A1* | 6/2002 | Yokochi | H04N 1/047 358/471 |
| 2008/0106773 | A1* | 5/2008 | Akiyama | H04N 1/32448 358/496 |
| 2009/0027745 | A1* | 1/2009 | Kweon | H04N 1/203 358/498 |
| 2010/0142011 | A1* | 6/2010 | Akahane | H04N 1/0057 358/498 |
| 2011/0194161 | A1* | 8/2011 | Nakamura | H04N 1/56 358/505 |
| 2011/0286049 | A1* | 11/2011 | Ishikawa | H04N 1/0402 358/474 |
| 2013/0027758 | A1* | 1/2013 | Shimizu | H04N 1/0473 358/475 |
| 2016/0094749 | A1* | 3/2016 | Sahara | H04N 1/0464 358/474 |
| 2018/0352641 | A1* | 12/2018 | Nishimura | G03F 7/70033 |
| 2020/0076979 | A1* | 3/2020 | Sillador | H04N 1/00482 |
| 2020/0366807 | A1* | 11/2020 | Omori | H04N 1/10 |
| 2021/0067652 | A1* | 3/2021 | Sato | H04N 1/00822 |
| 2022/0109768 | A1* | 4/2022 | Katoh | H04N 1/00785 |

* cited by examiner

FIG. 14
| LINE | TIME | POSITION | ACCUMULATION TIME |
|---|---|---|---|
| 1 | $T_1$ | $Y_1$ | $T_1 - 0$ |
| 2 | $T_2$ | $Y_2$ | $T_2 - T_1$ |
| 3 | $T_3$ | $Y_3$ | $T_3 - T_2$ |
| : | : | : | : |
| N | $T_N$ | $Y_N$ | $T_N - T_{N-1}$ |
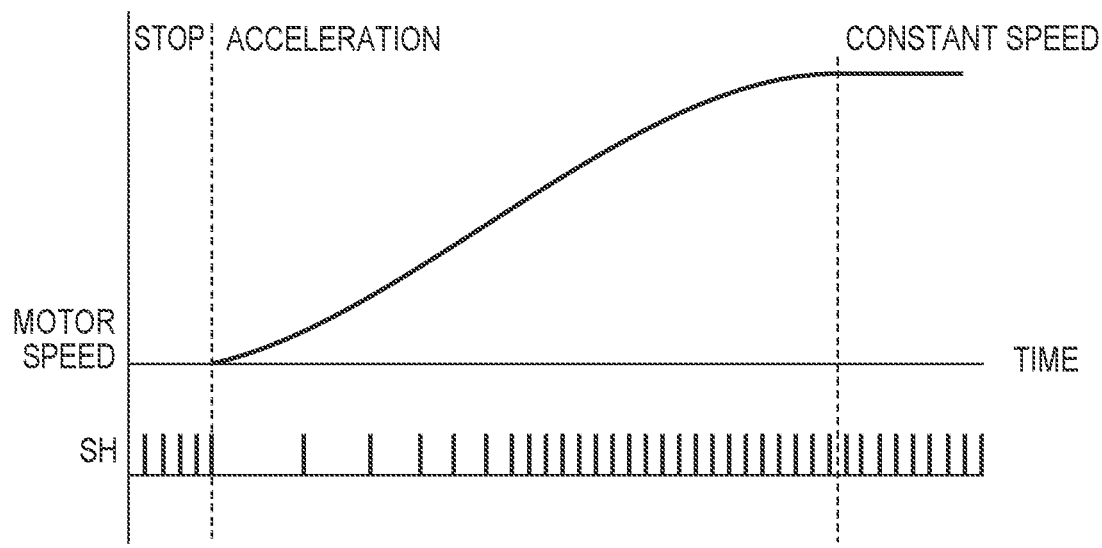
FIG. 15
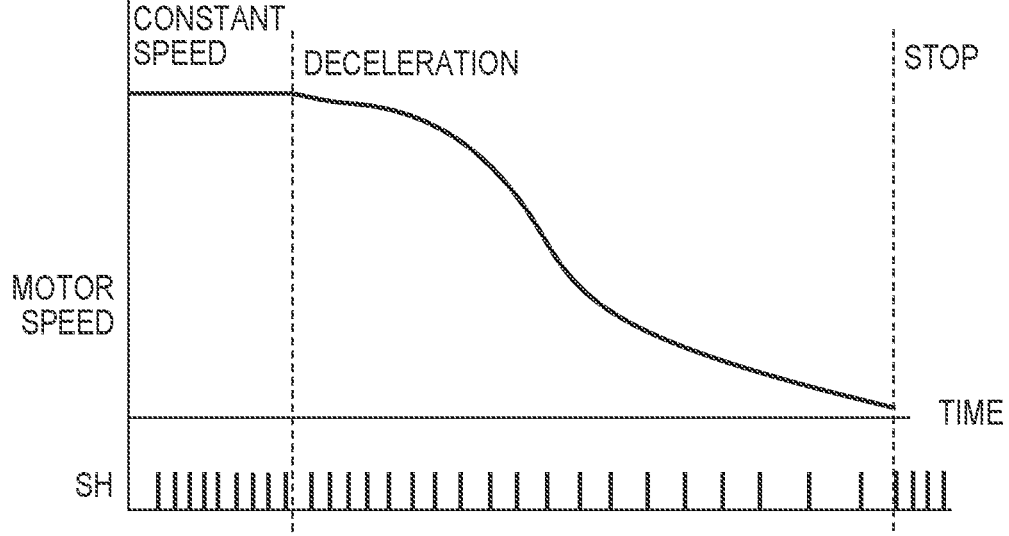
FIG. 16

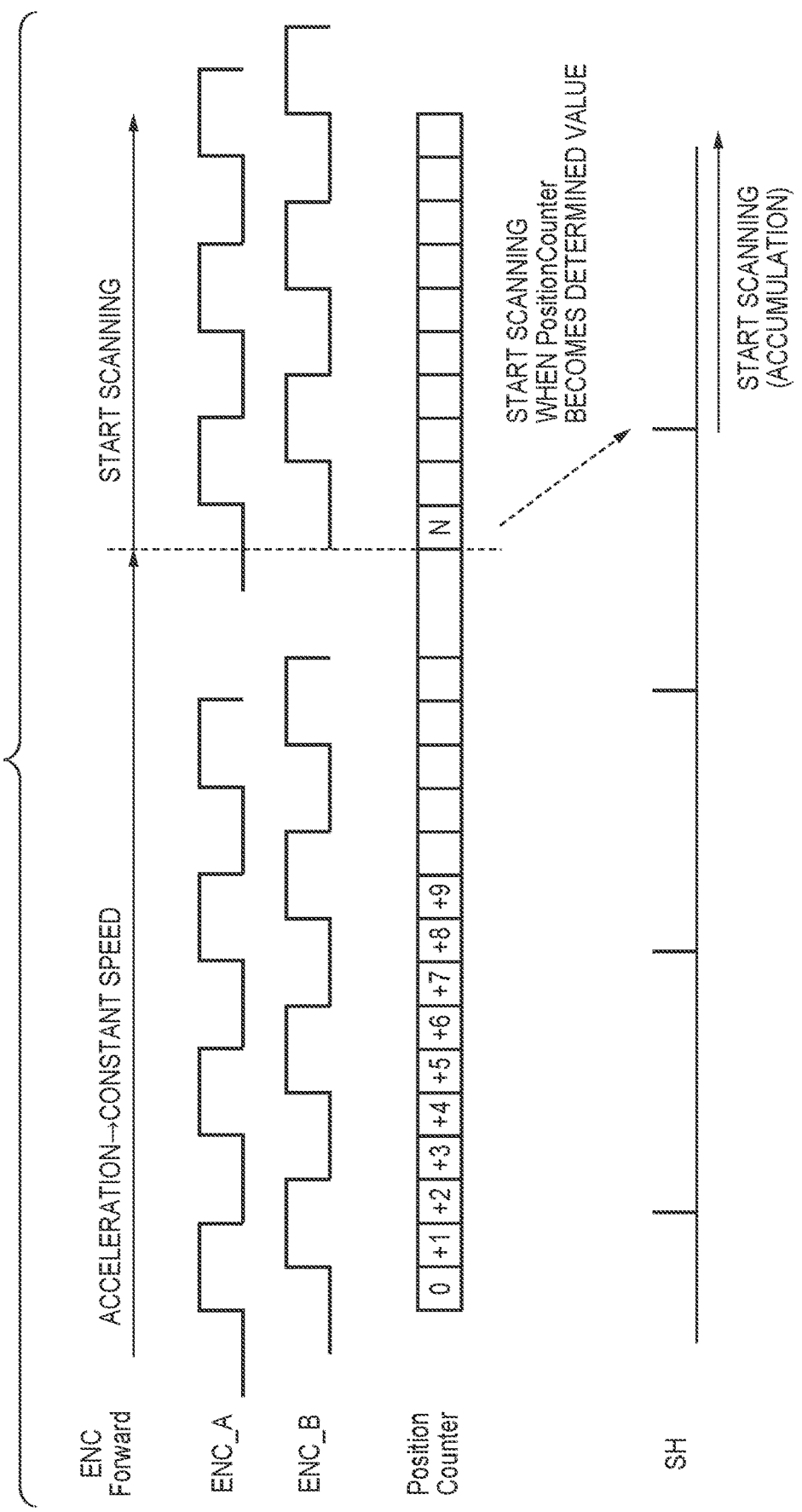

IMAGE READING APPARATUS AND COMPUTER-READABLE STORAGE MEDIUM

BACKGROUND OF THE INVENTION

Field of the Invention

The present invention relates mainly to an image reading apparatus.

Description of the Related Art

Among image reading apparatuses represented by scanners and the like, there are those that read an image in a period while a rotation speed of a scanner motor that moves the scanner unit is in a constant speed state and also in a period of an acceleration state or a deceleration state, in other words, while the rotation speed is changing (see Japanese Patent Laid-Open No. 5-284284). Such image reading can be advantageous for both improving the quality of image data and increasing the acquisition speed of the image data.

However, when the change of the rotation speed of the scanner motor is non-linear, accuracy of image reading by the configuration described in Japanese Patent Laid-Open No. 5-284284 may be possibly reduced during the change.

SUMMARY OF THE INVENTION

The present invention, which has been made inspired by the inventors' recognition of the aforementioned problem, realizes both a further improvement of the quality of image data and a further increase of the acquisition speed of the image data in a relatively easy manner.

One of the aspects of the present invention provides an image reading apparatus, comprising an image reading unit configured to perform image reading, a drive unit configured to move a target in the image reading, and a signal generating unit configured to generate a signal for driving the image reading unit, the image reading apparatus configured to acquire, with moving the target by the drive unit, image data by the image reading unit performing the image reading based on a signal generated by the signal generating unit, wherein the drive unit moves the target such that the target changes at a speed according to a predetermined driving speed profile, and the signal generating unit generates a signal, based on the driving speed profile, at a timing making the moving distance of the target to be an equal interval.

Further features of the present invention will become apparent from the following description of exemplary embodiments (with reference to the attached drawings).

BRIEF DESCRIPTION OF THE DRAWINGS

FIG. 14 is a diagram illustrating an accumulation time in the CIS;

FIG. 15 is a timing chart indicating the state of a signal SH in an acceleration state;

FIG. 16 is a timing chart indicating a state of the signal SH in a deceleration state; and FIG. 17 is a timing chart of image reading when acceleration reading is not necessary.

DESCRIPTION OF THE EMBODIMENTS

Figure 1:
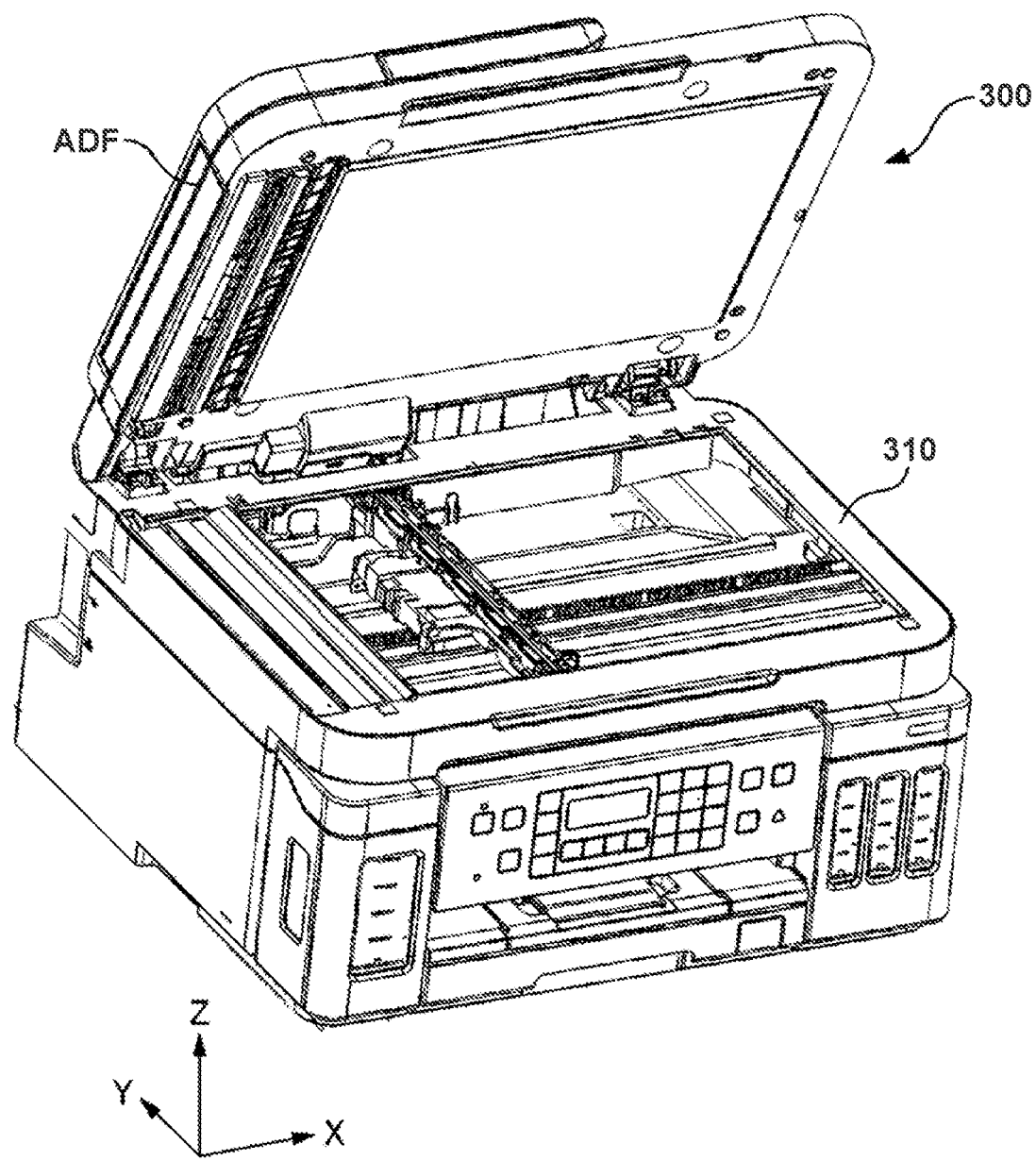
FIG. 1 is a perspective diagram of a multi-function peripheral according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a perspective diagram of a Multi-function Peripheral (MFP) 300 according to an embodiment. The MFP 300 includes an image reading unit 310 and a print head 316 (see FIG. 2) that prints an image on a print medium.

Figure 2:
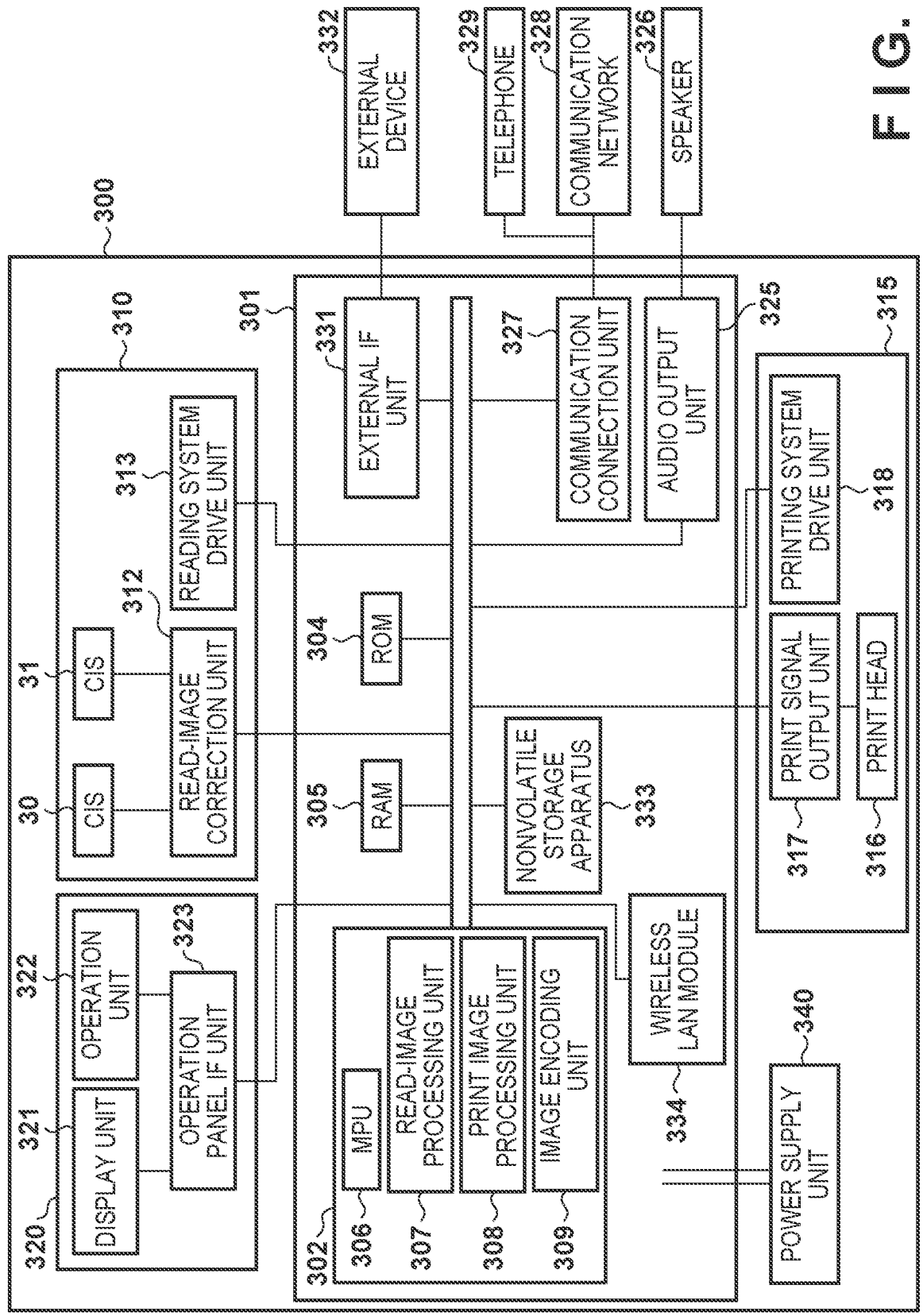
FIG. 2 is a block diagram illustrating a system configuration example of a multi-function peripheral according to an embodiment.

FIG. 2 is a block diagram illustrating a system configuration example of the MFP 300. It is assumed that the MFP 300 has various functions such as a scanner function of reading images from documents, a print function of printing on a print medium such as a paper material. In the present embodiment, the MFP 300 includes a control board 301, an image reading unit 310, a print unit 315, an operation panel 320, and a power supply unit 340.

Although details will be described later, it is assumed that the scanner function includes a function of reading at a document platen, and a function of reading using an Automatic Document Feeder (ADF).

The control board 301 includes a control Integrated Circuit (IC) 302, a system bus 303, a ROM 304, and a RAM 305. The control IC 302 includes a Microprocessor Unit (MPU) 306, a read-image processing unit 307, a print image processing unit 308, and an image encoding unit 309, and performs drive control of the entire system while communicating with other components via a system bus 303. The ROM 304 stores information, which is required for implementing the functions of the MFP 300, such as program codes, initial value data, table data that are used for arithmetic processing of the MPU 306. The RAM 305 functions as a work memory and may be used as a calculation buffer or an image memory, for example.

The image reading unit 310 includes a Contact Image Sensor (CIS) 30 and a CIS 31, a read-image correction unit 312, and a reading system drive unit 313. Any known image sensor such as a CCD/CMOS image sensor and the like having a plurality of pixels arranged therein may be used for the CIS 30 and CIS 31. The CIS 30 can selectively execute reading of a document at the document platen and reading of a front surface of the document using the ADF, and the CIS 30 may be denoted as a front surface CIS 30. The CIS 31 can execute reading of a back surface of the document using the ADF, and the CIS 31 may be denoted as a back surface CIS 31. When image reading is performed on both surfaces of a document, both the CIS 30 and CIS 31 will be the target of drive control.

For reading at the document platen, the CIS 30 is caused to scan the document, and for reading by the ADF, the document is conveyed with respect to the CIS 30 (and CIS 31). In both reading, image reading is performed by relatively moving the CIS 30 (and CIS 31) with respect to the document.

The reading system drive unit 313 includes an electric motor that generates motive power, and the positions of the CIS 30 and CIS 31 are moved by the motive power, whereby the CIS 30 and CIS 31 sequentially read images from the document and convert them into image signals, and generate image data therefrom. The read-image correction unit 312 can perform correction processing such as shading correction on the image data thus acquired, and the read-image processing unit 307 can perform predetermined image processing on the image data.

Here, the concept of an image that can be read from a document includes not only tangible objects such as characters, symbols, figures, and photographs, but also blanks that may be formed therebetween, and these are collectively referred to as image information in the following description, and acquisition of image information can be referred to as image reading or image acquisition.

The reading system drive unit 313 may include other motive power sources required for implementing image reading, in addition to a motor and the like configured to shift the positions of the CIS 30 and CIS 31. Examples of the foregoing may include a motor configured to convey a document, a motor configured to drive a roller for a case of two or more documents, which separates and picks up each of the documents, or the like. Furthermore, the reading system drive unit 313 may also include other components required for implementing image reading, such as a driver that performs drive control of the CIS 30 and CIS 31.

The main components that implement the function of the image reading unit 310 are typically arranged at an upper part of the MFP 300, and the print unit 315 that prints on a print medium may be arranged at a lower part of the MFP 300. The print unit 315 in the present embodiment includes a print head 316, a print signal output unit 317, and a printing system drive unit 318, and performs printing by ink jet printing method.

The print head 316 is provided with a plurality of nozzles, and can eject ink individually from the plurality of nozzles. The printing system drive unit 318 moves the print head 316 to a desired position, during the movement, the print signal output unit 317 outputs a print signal to the print head 316 based on the image data acquired by image processing by the print image processing unit 308. Based on the print signal, the print head 316 executes printing on a print medium by ejecting ink from corresponding nozzles.

The operation panel 320 includes a display unit 321, an operation unit 322, and an operation panel interface (IF) unit 323. The display unit 321 and the operation unit 322 are connected to the system bus 303 via the operation panel IF unit 323. Such a configuration allows for, for example, outputting an image to be displayed on the display unit 321, or accepting an operation input to the operation unit 322.

In addition, the control board 301 further includes an audio output unit 325, a communication connection unit 327, an external interface (IF) unit 331, a nonvolatile storage apparatus 333, and a wireless LAN module 334. The audio output unit 325 may, for example, convert audio data into signals and output an audio message through a speaker 326 which is an external sound source. The communication connection unit 327, which is connected to a communication network 328 or a telephone 329, for example, can input and output audio data and encoded data. Here, the encoded data can be converted to and from image data by the image encoding unit 309.

The external IF unit 331 is configured as an external connection unit conforming to a predetermined standard such as the USB standard, for example, and with the external IF unit 331, an external device 332 such as a personal computer can be connected to the MFP 300. The nonvolatile storage device 333, for which a flash memory and the like is typically used, can store work data, image data, and the like even when the MFP 300 is inactive state. The wireless LAN module 334 allows for inputting and outputting image data from and to an external access point. The power supply unit 340 supplies individual components of the MFP 300, such as the control board 301, the image reading unit 310, the print unit 315, and the operation panel 320, with power required to implement the functions thereof.

A part of the functions of the MFP 300 will be exemplified below.

Scan Operation

The image information read by the CIS 30 and CIS 31 of the image reading unit 310 is first subjected to image processing such as shading correction by the read-image correction unit 312. The image information is deployed in the RAM 305 as image data by the read-image processing unit 307, and subsequently compressed and encoded by the image encoding unit 309 into JPEG format, for example. The encoded data is output to the external device 332 via the external IF unit 331. The scan operation may acquire image data of the image information read by the CIS 30 and CIS 31 in the aforementioned manner.

Copy Operation

The image information read by the CIS 30 and CIS 31 of the image reading unit 310 is first subjected to image processing such as shading correction by the read-image correction unit 312. The image information is deployed in the RAM 305 as image data by the read-image processing unit 307, and subsequently compressed and encoded by the image encoding unit 309 into JPEG format, and temporarily stored in the RAM 305, for example. The image data is sequentially sent to the print image processing unit 308 and converted into print data. The print data is output to the print head 316 via the print signal output unit 317, whereby printing on a print medium is performed. In the copy operation, the image information read by the CIS 30 and CIS 31 may be printed on the print medium and copied.

Facsimile Transmission Operation

The image information read by the CIS 30 and CIS 31 of the image reading unit 310 is first subjected to image processing such as shading correction by the read-image correction unit 312. The image information is deployed in the RAM 305 as image data by the read-image processing unit 307, then compressed and encoded into the Modified Read (MR) format by the image encoding unit 309, and temporarily stored in the RAM 305, for example. The communication connection unit 327 transmits and receives signals for starting facsimile communication, and subsequently starts transmission of the image data. Transmission of the image data is continued until completion thereof, while performing image reading by the CIS 30 and CIS 31 and associated encoding and temporarily storing the image data. The facsimile transmission operation thus allows for transmitting desired image data to a communication target using a facsimile.

Facsimile Reception Operation

For example, in response to reception from the communication network 328, the communication connection unit 327 transmits and receives a signal for starting facsimile communication, and subsequently starts receiving image data. The image data is demodulated by the image encoding unit 309 and subsequently deployed in the RAM 305. The image data is sequentially sent to the print image processing unit 308 and converted into print data. The print data is output to the print head 316 via the print signal output unit 317, whereby printing on a print medium is performed. The facsimile reception operation allows for receiving arbitrary image data from a communication target by a facsimile.

Print Operation

A print job transmitted from the external device 332 and received via the external IF unit 331 is processed by the MPU 306, and deployed in the RAM 305 as image data by the image encoding unit 309, based on instruction commands, parameters, and the like included in the job. The image data is sequentially sent to the print image processing unit 308 and converted into print data. The print data is output to the print head 316 via the print signal output unit 317, whereby printing on a print medium is performed. In the print operation, arbitrary image information can be printed on a print medium and a printed material may be thus produced.

Figure 3:
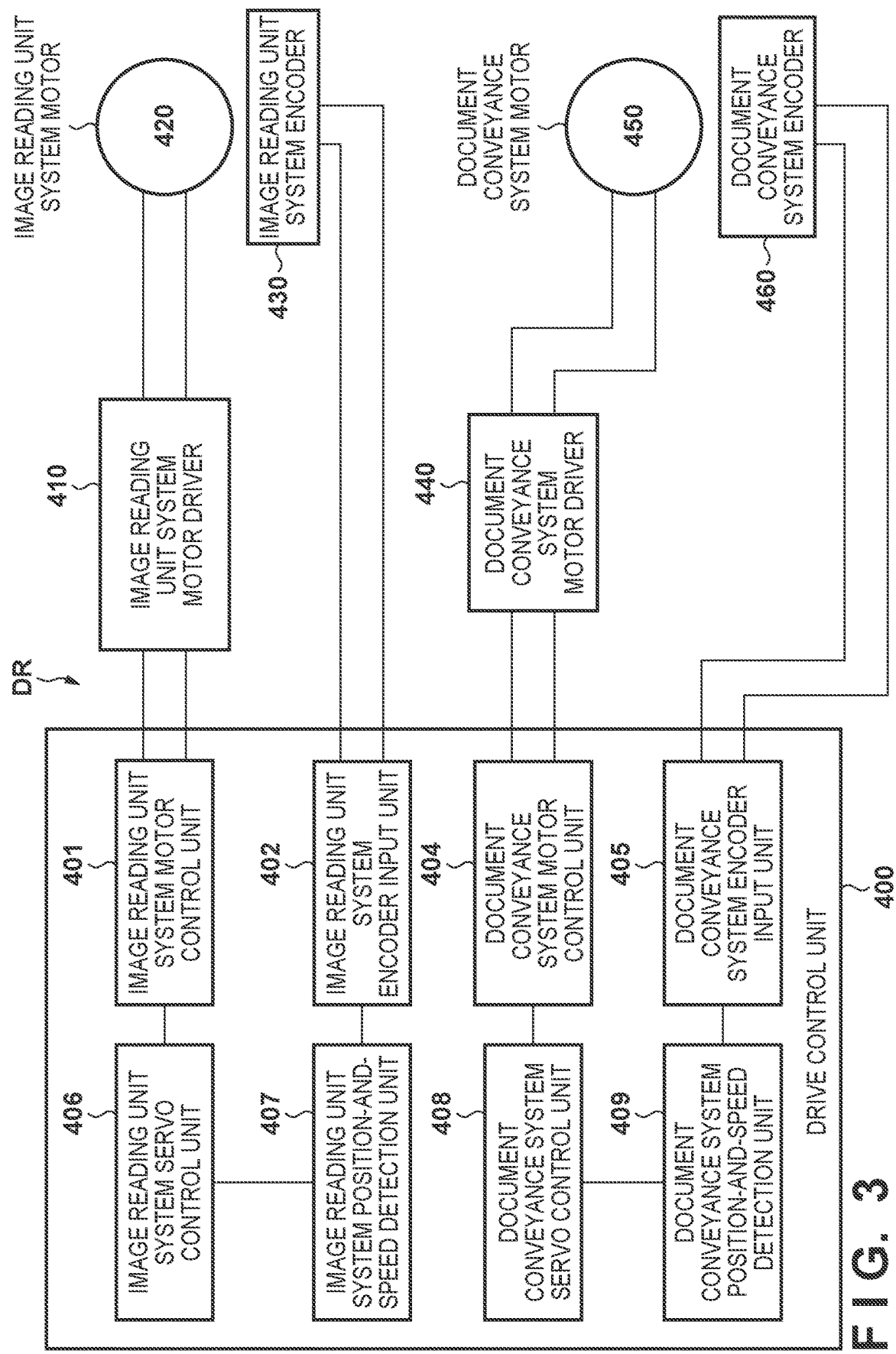
FIG. 3 is a block diagram illustrating a configuration example of a drive unit.

FIG. 3 is a block diagram illustrating a configuration example of a drive unit DR configured to execute image reading and document conveyance. In other words, the concept of the drive unit DR includes the reading system drive unit 313 and the printing system drive unit 318 described above.

The drive unit DR includes a drive control unit 400, motor drivers 410 and 440, motors 420 and 450, and encoders 430 and 460. The motor driver 410, the motor 420, and the encoder 430 are provided corresponding to the image reading function, and may also be referred to as an image reading unit system motor driver 410, an image reading unit system motor 420, and an image reading unit system encoder 430, respectively. In addition, the motor driver 440, the motor 450, and the encoder 460 are provided corresponding to the document conveyance function, and may also be referred to as a document conveyance system motor driver 440, a document conveyance system motor 450, and a document conveyance system encoder 460, respectively.

The drive control unit 400 includes a motor control unit 401, an encoder input unit 402, a servo control unit 406, and a position-and-speed detection unit 407 as components corresponding to the image reading function. They may also be referred to as an image reading unit system motor control unit 401, an image reading unit system encoder input unit 402, an image reading unit system servo control unit 406, and an image reading unit system position-and-speed detection unit 407, respectively.

In addition, the drive control unit 400 further includes a motor control unit 404, an encoder input unit 405, a servo control unit 408, and a position-and-speed detection unit 409 as components corresponding to the document conveyance function. They may also be referred to as a document conveyance system motor control unit 404, a document conveyance system encoder input unit 405, a document conveyance system servo control unit 408, and a document conveyance system position-and-speed detection unit 409, respectively.

With such a configuration, the drive control unit 400 generates a Pulse Width Modulation (PWM) signal, and controls the rotation speeds of individual motors. In image reading, for example, the motor driver 410 supplies a current based on the PWM signal to the motor 420 to generate motive power (rotation). A DC motor is typically used as the motor 420, the power of which is transmitted to components at a subsequent stage through a motive power transmission mechanism such as gears and belts. The encoder 430, which is assumed to be a rotary encoder provided coaxially with the motor 420, detects the rotation direction and the rotation amount of the motor 420.

Similarly to the image reading described above, each of the motor driver 440, the motor 450, and the encoder 460 implements a corresponding function in document conveyance.

In addition, servo control is performed for drive control of the motor 420 in image reading (the same goes for document conveyance). In other words, the encoder input unit 402 generates a signal based on an encoder signal which is a detected signal from the encoder 430, whereby the position-and-speed detection unit 407 detects the rotation direction, the rotation amount, and the rotation speed of the motor 420. Here, the rotation amount of the motor 420 corresponds to the position of the move target (here, the CIS 30 or CIS 31).

The servo control unit 406 compares the result of detection by the position-and-speed detection unit 407 and a target value, and generates a correction signal based on the comparison result to make the control of the motor 420 to be a desired mode (typically, feedback control is performed with PID control). The motor control unit 401 generates a PWM signal based on a signal from the servo control unit 406.

Figure 4:
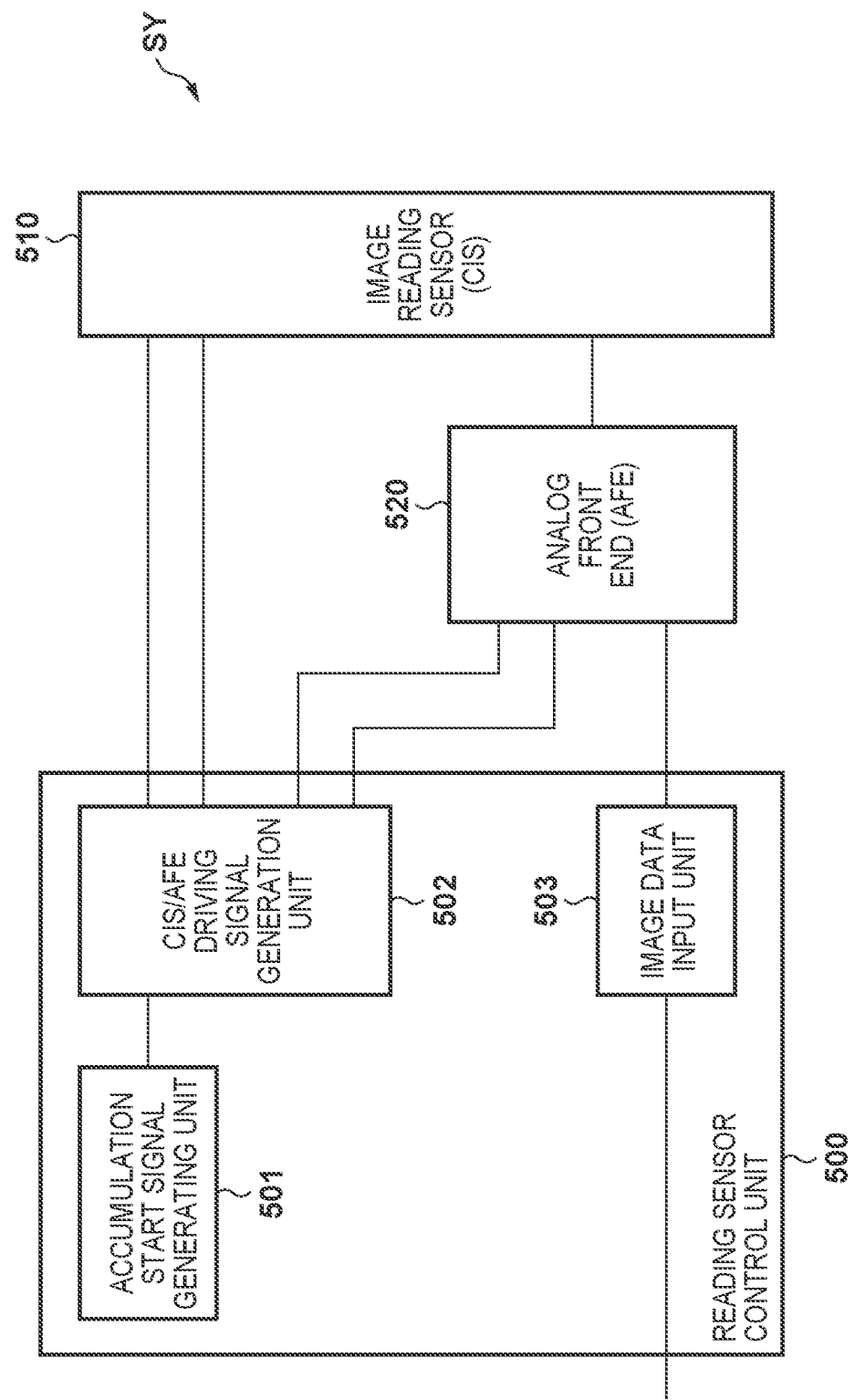
FIG. 4 is a block diagram illustrating a configuration example of a detection system that can execute image reading.

FIG. 4 is a block diagram illustrating a system configuration example of a detection system SY that can execute image reading. The detection system SY includes an image reading sensor 510 as the CIS 30 or CIS 31, a CIS control unit 500 that performs drive control of the image reading sensor 510, and an Analog Front End (AFE) 520. The CIS control unit 500 includes an accumulation start signal generating unit 501, a CIS/AFE drive signal generating unit 502, and an image data input unit 503.

The accumulation start signal generating unit 501 generates an accumulation start signal (hereinafter referred to as "signal SH", details of which will be described later) for starting charge accumulation by the sensor 510. Based on the signal SH, the sensor 510 accumulates charges generated by photoelectric conversion, and acquires a group of pixel signals based on the charge accumulation amount as image signals. Image signals, which are analog signals acquired by image reading with the sensor 510, are converted into digital signals through Analog-to-Digital (AD) conversion by the AFE 520. The image data input unit 503 performs predetermined correction processing on the digital signals to generate image data, and the drive signal generating unit 502 generates drive signals for drive control of the sensor 510 and the AFE 520.

Figure 5:
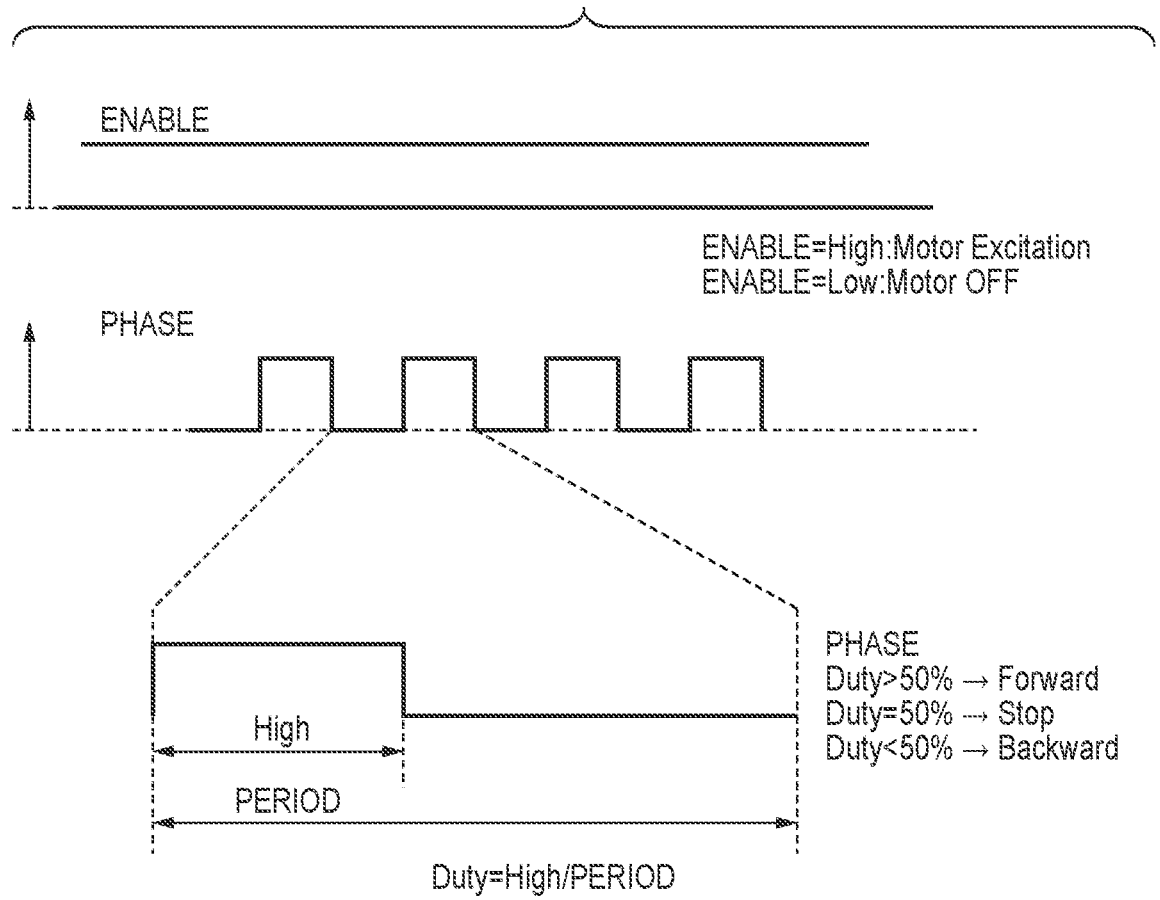
FIG. 5 is a timing chart illustrating an example of a waveform of a control signal of a motor control unit.
Figure 6:
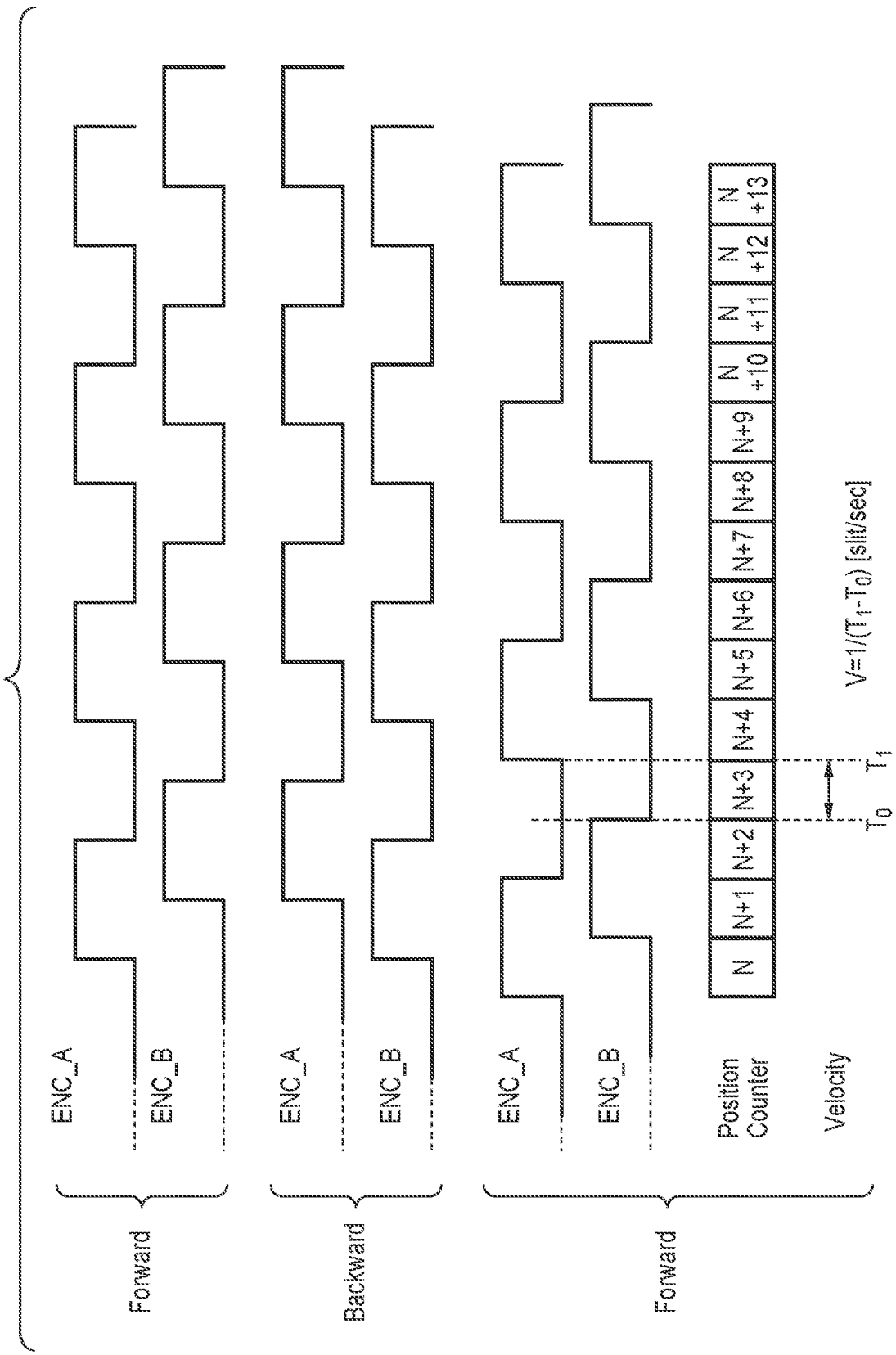
FIG. 6 is a timing chart illustrating an example of a waveform of an encoder signal of an encoder.

FIG. 5 is a timing chart for explaining an example of the waveform of the control signal of the motor control unit (the motor control unit is assumed to be the motor control unit 401 here, the same goes for the motor control unit 404). FIG. 6 is a timing chart for explaining an example of the waveform of the encoder signal of the encoder (the encoder is assumed to be the encoder 430 here, the same goes for the encoder 460).

As illustrated in FIG. 5, signals supplied by the motor control unit 401 to the motor driver 410 is denoted as a signal ENABLE and a signal PHASE. The signal ENABLE is a signal for exciting the motor 420, which excites the motor 420 at a High (H) level and suppresses the excitation at a Low (L) level.

The signal PHASE is a PWM signal for setting the rotation direction and the current value of the motor 420. The period PERIOD of the signal PHASE, which is generally fixed, may be set to 25 kilohertz (kHz), for example. Duty (or duty ratio) indicates a ratio of the duration of the H level of the signal PHASE relative to the period PERIOD. For example, Duty=50% indicates that the motor 420 is stopped. Duty>50% indicates that the motor 420 is rotated in the forward direction (scanning direction of the document (direction from home side to away side)), and that the rotation speed of the motor 420 becomes higher as the Duty approaches closer to 100%. In addition, Duty<50% indicates that the motor 420 is rotated in the reverse direction (return direction of the document (direction from away side to home side)), and that the rotation speed of the motor 420 becomes higher as the Duty approaches closer to 0%.

As illustrated in FIG. 6, the encoder 430 outputs signals of two phases that are signals ENC_A and ENC_B. As can be seen from the rotation direction, when the phase of the signal ENC_A is advanced relative to the signal ENC_B, the rotation direction is the forward direction (scan direction), and when the phase of the signal ENC_A is delayed relative to the signal ENC_B, the rotation direction is the reverse direction (return direction).

In other words, the encoder input unit 402 generates a signal based on an encoder signal, which is a detection signal from the encoder 430, whereby the position-and-speed detection unit 407 detects the rotation direction, the rotation amount (position of the move target), and the rotation speed of the motor 420. The encoder signals are input to the position-and-speed detection unit 407 as signals ENC_A and ENC_B via a noise filter of the encoder input unit 402, for example after signals having a relatively narrow pulse width are removed. The rotation amount is detected by measuring the edge (rising edge (rise edge) or falling edge (fall edge)) of the signals ENC_A and ENC_B, and the rotation speed is detected by measuring the time difference between the edges.

Figure 7:
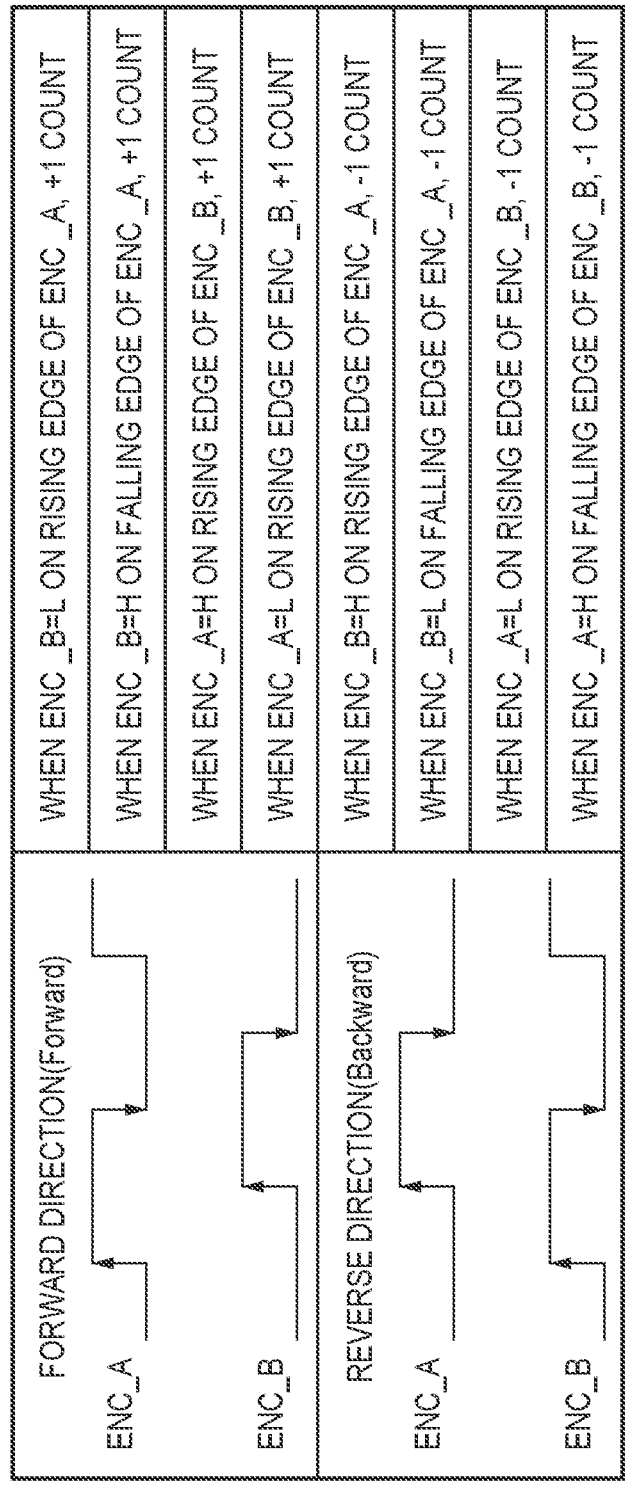
FIG. 7 illustrates a logic when a rotation amount of a motor is measured.

FIG. 7 illustrates a logic when the rotation amount is measured based on the encoder signal described above. In the present embodiment, a measurement counter is incremented (+1) or decremented (−1) at the rising edge and the falling edge of one of the signals ENC_A and ENC_B, based on the signal value of the other of the signals ENC_A and ENC_B.

For example, the counter is incremented (+1) when the signal ENC_B is at the L level at the rising edge of the signal ENC_A. In addition, the same goes for when the signal ENC_B is at the H level at the falling edge of the signal ENC_A, when the signal ENC_A is at the H level at the rising edge of the signal ENC_B, and when the signal ENC_A is at the L level at the falling edge of the signal ENC_B.

When, on the other hand, the signal ENC_B is at the H level at the rising edge of the signal ENC_A, the counter is decremented (−1). In addition, the same goes for when the signal ENC_B is at the L level at the falling edge of the signal ENC_A, when the signal ENC_A is at the L level at the rising edge of the signal ENC_B, and when the signal ENC_A is at the H level at the falling edge of the signal ENC_B.

The rotation speed may be detected by calculating the inverse number of the time difference between the edges. For example, the falling edge of the signal ENC_B and the rising edge of the signal ENC_A correspond to a rotation amount of one slit of the encoder 430. Therefore, denoting respective time by $T_0$ and $T_1$ (see FIG. 6), the rotation speed can be expressed as $1/(T_1-T_0)$ [Slit/sec].

Figure 8:
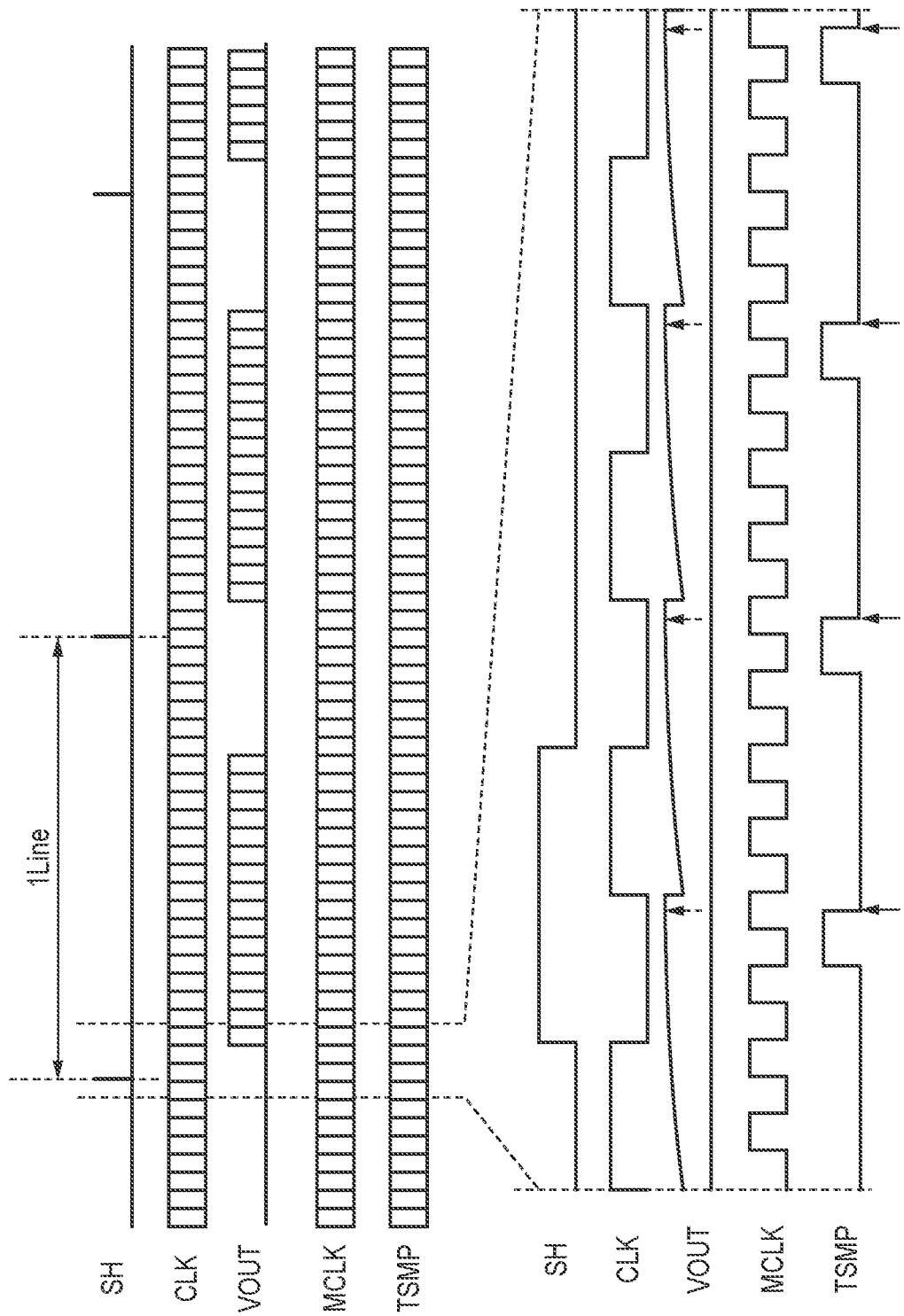
FIG. 8 is a timing chart indicating waveforms of each of the signals in image reading.

FIG. 8 is a timing chart indicating waveforms of each of the signals in image reading by the CIS 30, as an example. In FIG. 8, a signal SH for starting charge accumulation, a CLK signal for transferring a signal corresponding to a charge accumulation amount, and a pixel signal VOUT based on the charge accumulation amount are illustrated as signals for performing drive control of the CIS 30. In addition, a signal MCLK which is a clock signal for driving the AFE 520, and a signal TSMP for sampling signals corresponding to the charge accumulation amounts are illustrated.

Here, it is assumed that the CIS 30 is formed by arranging a plurality of pixels in a matrix form, the signal SH is provided to each row to be an H-level pulse, and image reading is started at a timing when an H-level pulse of the signal SH corresponding to the first row is provided. The signal CLK is supplied to each pixel in the corresponding row on a one-to-one basis, whereby signals sampled by the pixel until then are output as the signal VOUT. The number of signals MCLK may vary depending on the configuration of the AFE 520, signals MCLK are provided here to make the clock number for a single pixel to be four. In addition, it is assumed that an H-level pulse is provided, as the signal TSMP, to a single pixel, whereby the aforementioned sampling timing is determined. In the AFE 520, sampling is performed when the signal TSMP is at the H level, and the sampled signal is fixed (held) when it falls to the L level, i.e., at the timing indicated by the arrow.

In another embodiment, the CIS 30 may be configured to have switchable resolutions, in which case a signal for switching resolutions can be added.

Figure 9:
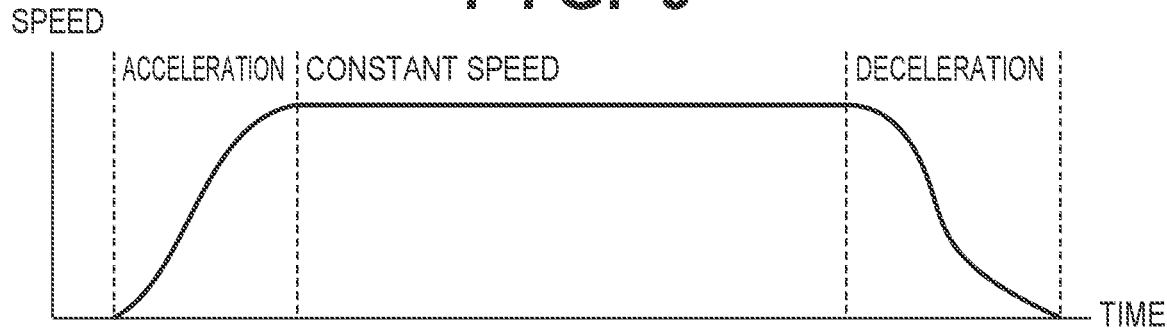
FIG. 9 is a timing chart for explaining a mode of change in the rotation speed of the motor.
Figure 10:
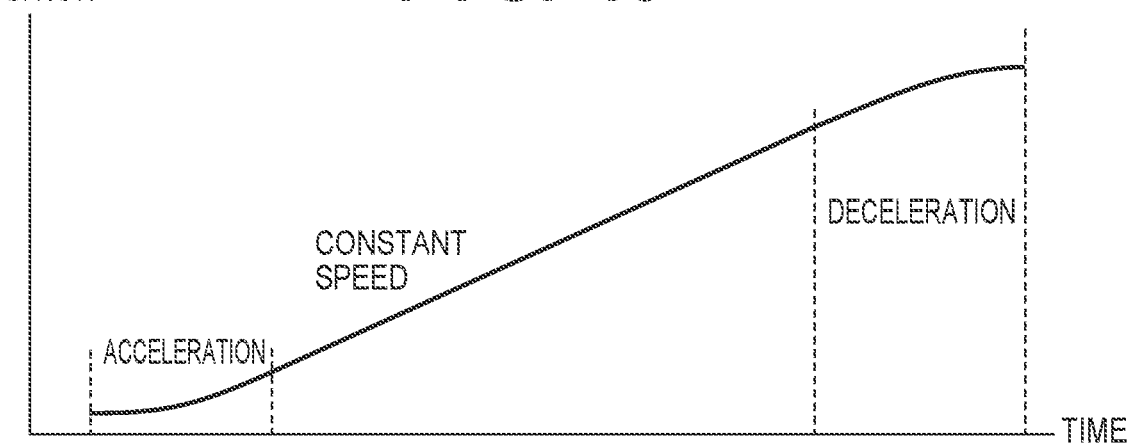
FIG. 10 is a timing chart indicating the rotation amount of the motor.

FIG. 9 is a timing chart for explaining a mode of change in the rotation speed of the motor 420 in image reading, and FIG. 10 is a timing chart indicating the rotation amount of the motor 420 (position of the move target) at that time.

Generally, due to the inertial force of the motor 420, the rotation speed of the motor 420 may have a period of acceleration or deceleration during a period from a stop state to a constant speed rotation state or during a period from a constant speed rotation state to a stop state. Therefore, in the example of FIG. 10, the motor 420 may have an acceleration state, a constant speed state, and a deceleration state. The motor 420 is controlled in the acceleration state such that the rotation speed gradually increases to achieve the target speed, is controlled in the constant speed state such that the rotation speed maintains the target speed, and is controlled in the deceleration state such that the rotation speed gradually decreases to achieve the target speed.

In the following description, the aforementioned acceleration state, constant speed state, and deceleration state may be simply represented as acceleration, constant speed, and deceleration, respectively.

The aforementioned target speed may be preliminarily set by the servo control unit 406 (the servo control unit 408 in the case of the motor 450) described referring to FIG. 3 such that the target speed may be set to be a constant value in the constant speed state, and that the target speed may be set to conform to a predetermined acceleration and deceleration characteristics in the acceleration state and the deceleration state. The acceleration and deceleration characteristics may be a function of time, or may be set by the table values. Note that the acceleration and deceleration characteristics may be referred to as an acceleration and deceleration profile or simply a profile.

Here, the rotation amount of the motor 420 may be calculated by integration of the rotation speed. Therefore, the characteristics in the acceleration state and the deceleration state can be calculated by integration of the aforementioned function or table values. Alternatively, the calculation result of the integration may be preliminarily stored in a predetermined memory.

Figure 11:
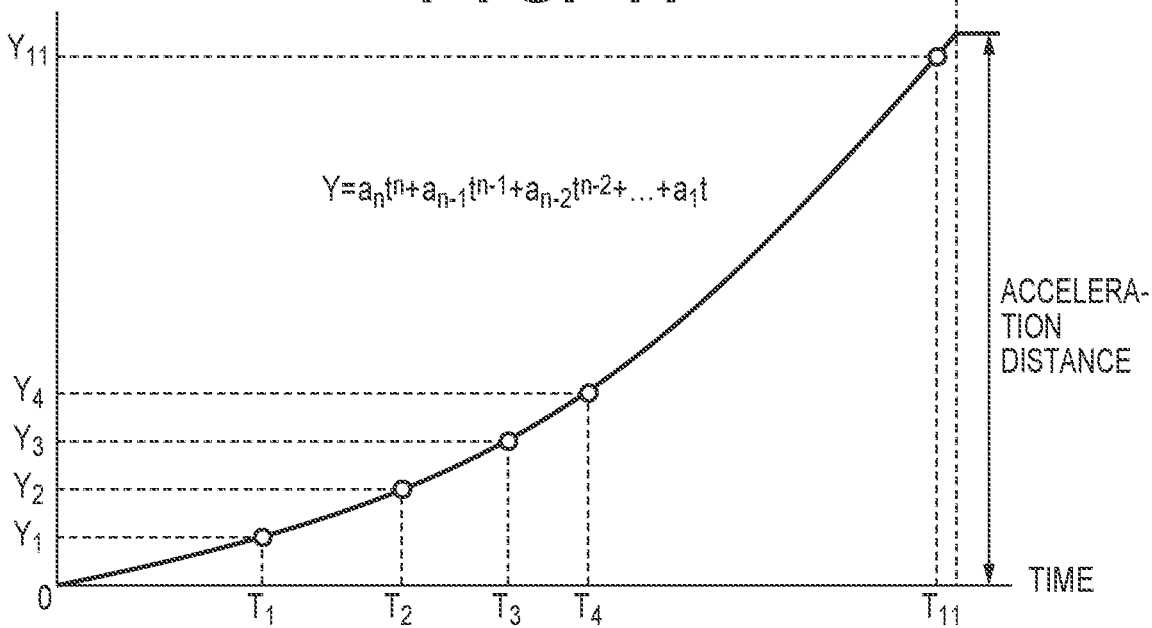
FIG. 11 is a graph indicating positions of a move target with respect to time when the motor is in an acceleration state.
Figure 12:
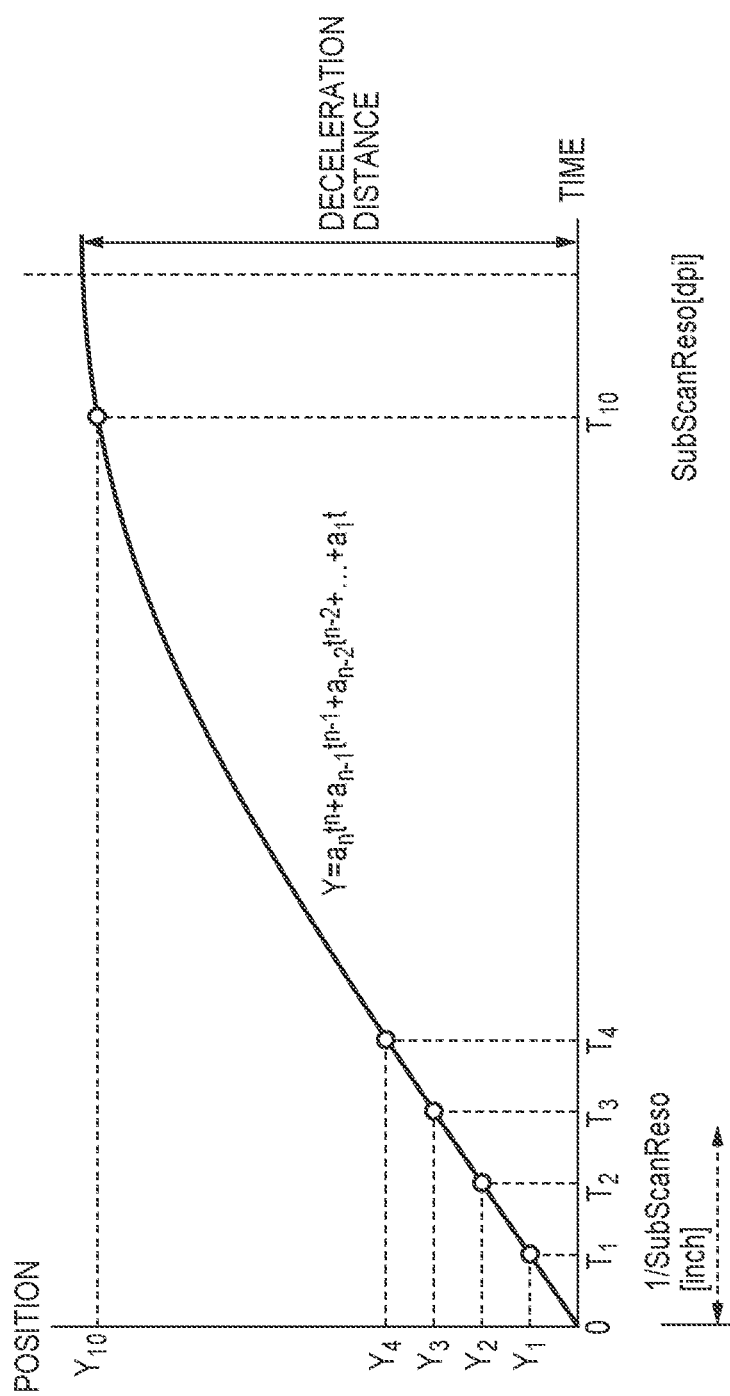
FIG. 12 is a graph indicating positions of the move target with respect to time when the motor is in a deceleration.

FIG. 11 is a graph indicating a relation between times $T_1$ to $T_N$ (denoted as time $T_1$ and the like when those are not distinguished) in a certain row when the motor 420 is in an acceleration state in execution of image reading, and positions $Y_1$ to $Y_N$ of the move target (denoted as a position $Y_1$ and the like when those are not distinguished). Similarly, FIG. 12 illustrates a graph when the motor 420 is in a deceleration state.

In FIG. 11 (acceleration state), the positions $Y_1$ and the like are indicated at an equal interval of a distance smaller than the acceleration distance, and the times $T_1$ and the like corresponding to the positions $Y_1$ and the like are indicated. Here, it suffices that the position $Y_1$ and the like are preliminarily set to known values. Similarly, in FIG. 12 (deceleration state), the position $Y_1$ and the like are illustrated at an equal interval of a distance smaller than the deceleration distance, and the time $T_1$ and the like corresponding to the position $Y_1$ and the like are indicated. In the drawings, the starting time and position of acceleration and deceleration are set as the origin 0, and the time $T_1$ and the like are included in the acceleration period in FIG. 11 and are included in the deceleration period in FIG. 12.

Although details will be described later, the position $Y_1$ and the like and the time $T_1$ and the like are represented by preliminarily set acceleration characteristics or deceleration characteristics, and image reading is performed by acquiring pixel signals, with the signal SH, at a plurality of positions $Y_1$ and the like which are at an equal interval on the document.

The acceleration characteristic (FIG. 11) is represented by an n-th degree polynomial using a function of time, which may be represented, in this example, as follows.

$$y = a_n t^n + a_{n-1} t^{n-1} + a_{n-2} t^{n-2} + \ldots + a_1 t \quad \text{(Formula 1)}$$

Here, $a_1$ to $a_n$ are coefficients, and $a_0 = 0$ since the graph passes through the origin (0, 0).

Although n in the foregoing is an integer equal to or larger than 2, n may be an integer of 3 or more in order to increase the accuracy of drive control, and the numerical value of n may be changed as necessary.

The aforementioned Formula 1 may be respectively represented as Formula 2 below, using the position $Y_1$ and the like and the time $T_1$ and the like.

$$Y_1 = a_n T_1^n + a_{n-1} T_1^{n-1} + a_{n-2} T_1^{n-2} + \ldots + a_1 T_1 \quad \text{(Formula 2)}$$

-continued
$$Y_2 = a_n T_2^n + a_{n-1} T_2^{n-1} + a_{n-2} T_2^{n-2} + \ldots + a_1 T_2$$
$$\vdots$$
$$Y_N = a_n T_N^n + a_{n-1} T_N^{n-1} + a_{n-2} T_N^{n-2} + \ldots + a_1 T_N$$

Here, the coefficient $a_1$ and the like and the position $Y_1$ and the like are known in the aforementioned Formula 2. Therefore, it is possible to calculate the time T1 and the like, based on the arithmetic processing of an equation of high degree. The same goes for the deceleration characteristics (FIG. 12), and the arithmetic expression thus specified can be used as the aforementioned acceleration and deceleration profile.

Figure 13:
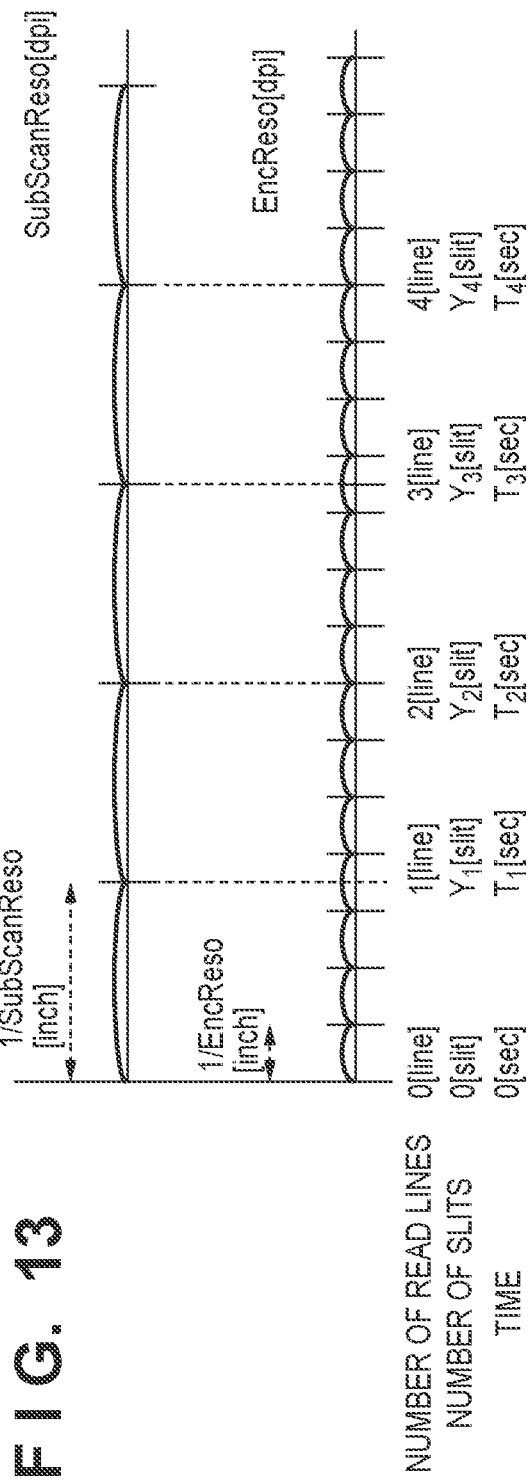
FIG. 13 is a diagram illustrating a relation between an encoder position and a reading position.

A method for determining the position Y1 and the like will be described, referring to FIG. 13. FIG. 13 is a diagram illustrating a position detected by the encoder 430 (or 460) in association with a position at which a pixel signal is acquired by the signal SH, in other words FIG. 13 is a diagram illustrating a relation between the encoder position and the reading position.

Here, a target to be read in a single operation by the CIS 30 (or 31) (a target to be read in a single drive operation of a plurality of pixels arranged in a matrix form, in other words, a H-level pulse of the signal SH in a single operation) is defined as a read line. For the read line, when the sub-scanning resolution is SubScanReso [dpi], a single line is given by 1/SubScanReso [inch]. For the encoder position, when the encoder resolution is EncReso [dpi], a single slit is given by 1/EncReso [slit]. In addition, the distance per line is given by EncReso/SubScanReso [slit].

Therefore, the position $Y_1$ and the like of the read line may be represented as follows.

$$Y_1 = 1 \times EncReso/SubScanReso$$
$$Y_2 = 2 \times EncReso/SubScanReso$$
$$\vdots$$
$$Y_N = N \times EncReso/SubScanReso$$

Note that all of the aforementioned parameters may be real numbers, integers or decimals.

FIG. 14 is a diagram illustrating the accumulation time in the CIS 30. After the position $Y_1$ and the like and the time $T_1$ and the like have been determined as described above, the accumulation time in the CIS 30 is calculated. The accumulation time for each line is calculated by a time difference of the time $T_1$ and the like between lines, in other words, the accumulation time for the k-th row can be represented by $T_k - T_{k-1}$ (where k=1 to N). For example, $T_1 - 0$ holds for the first row ($T_0 = 0$ since the graph passes through the origin (0, 0)), and $T_2 - T_1$ holds for the second row.

In the foregoing manner, the time $T_1$ and the like are calculated based on the position $Y_1$ and the like that are at an equal interval on the document, and the signal SH is generated corresponding to the time $T_1$ and the like, and thus image reading can be appropriately executed even in the acceleration state and the deceleration state of the motor 420.

It suffices that the values presented in FIG. 14 are set for each line by the aforementioned calculation according to the accumulation start signal generating unit 501, in which a timer using an internal clock may be typically used as the accumulation start signal generating unit 501. Alternatively, the values presented in FIG. 14 may be preliminarily calculated based on known acceleration and deceleration characteristics. In another example, the values presented in FIG. 14 may be preliminarily stored in a memory such as the RAM 305 and read out line by line, which may be executed over time based on a timer.

FIG. 15 is a timing chart indicating a state of the signal SH that may be used for drive control of the CIS 30 (or 31) in the acceleration state. Similarly, FIG. 16 illustrates a timing chart in the deceleration state.

In the acceleration state, the signal SH is generated such that the interval of the H-level pulse for each line becomes shorter, as illustrated in FIG. 15. In the constant speed state, the signal SH is generated such that the interval of the H level pulse is constant. In the deceleration state, the signal SH is generated such that the interval of the H-level pulse for each line becomes longer, as illustrated in FIG. 16. Accordingly, the present embodiment allows for acquiring pixel signals with an accuracy/quantity similar to that for the constant speed state, even in the acceleration state and the deceleration state, in other words, image reading can be performed with accelerating or decelerating the CIS 30 (or 31). Such image reading in the acceleration state and the deceleration state can also be represented as acceleration reading and deceleration reading, respectively, which can be collectively represented as acceleration and deceleration reading.

Note that, in the present example, the H-level pulse of the signal SH is supplied even in the stop state and so-called dummy read of signals is performed with the pulses, and the pixel signals acquired in the stop state may be discarded. It is assumed that the signal SH in the present aspect is supplied as an H-level pulse having a period similar to that in the constant speed state, the present invention is not limited thereto.

Here, servo control is performed in drive control of the motor 420 (or 450) as has been described above, generally an error may occur at the start of acceleration and at the end of deceleration (when the rotation speed is relatively low). Therefore, it is also possible to generate the signal SH and start acquisition of pixel signals after the rotation speed has exceeded the reference in acceleration, and suppress generation of the signal SH and terminate acquisition of pixel signals before the rotation speed falls below the reference in deceleration.

Additionally, as has been described above, the CIS 30 can read at a document platen and can read using an ADF in image reading. Therefore, when an image reading target is up to the edge of the document, it is also possible to start acceleration before the CIS 30 is positioned within the frame of the document and perform deceleration such that the CIS 30 will stop after the CIS 30 positions out of the frame of the document.

Incidentally, acceleration reading and/or deceleration reading may be omitted depending on the image reading scheme. For example, a sufficient acceleration distance of the CIS 30 can be secured in reading at a document platen, and therefore acceleration reading may be omitted while the CIS 30 is moving with acceleration. In reading using an ADF, image reading is generally performed sequentially on a plurality of documents, the second and subsequent documents are substantially in a constant speed state, and therefore the constant speed state is maintained until image reading of the last document is completed, and thus deceleration reading may be omitted.

Here, when free space in the memory is running out during image reading, it is possible to decelerate and stop the motor 420 and return the CIS 30 to the standby position, and then, when free space has occurred in the memory, accelerate the motor 420 again to resume image reading (switchback processing). In such a case, acceleration distance/deceleration distance can be secured by resuming the image reading from the middle of the document, and therefore acceleration and deceleration reading is no longer required.

Additionally, in reading using an ADF, in order to increase the speed of image reading for a plurality of documents, an inter-document distance may be set shorter. When free space (including a case where the amount of free space has fallen below a reference value) in the memory is running out during image reading using an ADF, so-called inter-page stop may be performed that decelerates and stops the motor 420 after completion of image reading of a certain document, and accelerates the motor 420 again after a free space has occurred in the memory. In such a case, since it is difficult to secure a sufficient acceleration distance for image reading of the next document, the efficiency of image reading can be improved by performing acceleration reading. On the other hand, for a document from which image acquisition has been completed, the motor 420 is eventually decelerated in response to the running out of free space in the memory, and thus the deceleration reading is not necessary.

FIG. 17 is a timing chart illustrating the control content when image reading is started in a case where acceleration reading is not necessary for reading at a document platen. In the present example, it is assumed that acceleration of the motor 420 is completed before image reading starts, the rotation speed of the motor 420 is in the constant speed state of a substantially constant speed (within an error range of servo control), and the CIS 30 is driven according to a corresponding setting of the accumulation time. Therefore, image reading in the present example may be started in response to the position detected by the encoder 430 (or 460) having reached the start position of image reading, image reading may be started earlier by 0.5 lines, for example, by taking into account a detection error, a control delay, and the like.

Reading using an ADF does not generally require deceleration reading, and therefore it suffices to set the accumulation time to a value corresponding to the predetermined period, at the time when image reading of a single document is completed. Since acceleration and deceleration of the motor 420 is not performed while the free space of the memory is equal to or larger than the reference value, image reading may be started based on the result of detection by the encoder 430 with the constant speed state being maintained, similarly to the reading at the document platen. Here, when the free space of the memory falls below the reference, the motor 420 is decelerated and stopped, and when the motor 420 is accelerated again, acceleration reading may be performed.

According to the present embodiment as has been described above, the motor driven in image reading is controlled based on a predetermined acceleration and deceleration profile at the time of the acceleration and deceleration. Therefore, the timing that makes the rotation amount of the motor (the move distance of the move target) to be in an equal interval can be calculated or specified by an arithmetic processing based on the acceleration and deceleration profile. Accordingly, it is possible to acquire pixel signals in the acceleration state and the deceleration state of the motor with a similar accuracy/quality as that in the constant speed state, and thus, improving the quality of image data and increasing the acquisition speed of the image data can be realized.

In the present specification, the present embodiment has been described mainly focusing on the motor 420, the contents of the embodiment are also applicable to the control of other motors (for example, the motor 450). In other words, the contents of the present embodiment can be applied to any component to be moved in image reading and any component to be driven in association therewith.

In the present specification, the present embodiment has also been described focusing on acceleration and deceleration of the motor 420, the contents are also applicable to a case where the rotation speed of the motor 420 varies according to a predetermined profile. In other words, the profile may be any profile as long as it can specify the amount of change when the rotation speed of the motor 420 (the move speed of the move target) changes, and can be denoted as a driving speed profile, a rotation speed profile, a move speed profile, and the like, according to the aspect.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

<Addendum>

In the above description, an MFP 300 having a printing function using ink jet printing method is described as an example, the printing function is not limited to the aforementioned aspects, and may be a function for manufacturing, with a predetermined printing method, color filters, electronic devices, optical devices, microstructures, and the like. In addition, the MFP 300 may be any image reading apparatus having a scanning function as a main function, as long as the MFP 300 is configured to be able to execute the aforementioned acceleration and deceleration reading. Here, the image reading apparatus can also be referred to as a scanner when it is configured to exclusively adopt reading at a document platen. Furthermore, the MFP 300 may be another electric apparatus having the scanning function as a sub-function.

The term "printing" mentioned herein should be broadly interpreted. Therefore, the aspect of "printing" includes an object formed on a print medium which may or may not be meaningful information such as characters or figures, and the object which may or may not be visualized for a person to visually perceive.

Similarly to the aforementioned "printing", the term "print medium" should be broadly interpreted. The concept of "print medium" therefore includes, in addition to generally used paper, materials that can accept ink, such as cloth, plastic film, metal plate, glass, ceramics, resin, wood, leather, and the like.

In addition, the term "ink" should be broadly interpreted similarly to the aforementioned "printing". The concept of "ink" therefore may include, in addition to liquid that is applied onto a print medium to form images, markings, patterns, and the like, auxiliary liquid that may be applied for processing of the print medium, or treatment of ink (e.g., solidification or insolubilization of colorant in the ink applied to the print medium).

Although individual components in the foregoing embodiments are named with expressions based on their main functions, the functions described in the embodiments may be sub-functions and the nomenclature is not strictly limited the expressions. In addition, the expressions can be replaced by similar expressions. Similarly, the expression "unit" or "portion" can be replaced by "component", "member", "structure", "assembly", "means", and the like. Alternatively, they may be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-165018, filed Oct. 13, 2022 and Japanese Patent Application No. 2023-126438, filed Aug. 2, 2023 which are hereby incorporated by reference herein in their entirety.

What is claimed is:

1. An image reading apparatus comprising:
an image reading unit configured to perform image reading;
a drive unit configured to move a target in the image reading; and
a signal generating unit configured to generate a signal to drive the image reading by the image reading unit,
the image reading apparatus being configured to acquire, with moving of the target by the drive unit, image data by the image reading unit performing the image reading based on the signal generated by the signal generating unit, wherein
the drive unit moves the target such that a moving speed of the target changes according to a predetermined driving speed profile,
the signal generating unit generates the signal, based on the predetermined driving speed profile, at a timing that makes a moving distance of the target to be an equal interval, and
the timing at which the signal generating unit generates the signal is a timing that makes the moving distance of the target to be an equal interval, in both a period while the moving speed of the target is changing and a period while the target is in a constant speed state.

2. The image reading apparatus according to claim 1, wherein
the predetermined driving speed profile includes an acceleration and deceleration profile, and
the drive unit moves the target such that the target accelerates or decelerates in accordance with the acceleration and deceleration profile.

3. The image reading apparatus according to claim 2, wherein, the image reading unit starts the image reading after the target is accelerated and before the target enters a constant speed state.

4. The image reading apparatus according to claim 2, wherein, the image reading unit terminates the image reading after the target is decelerated and before the target is in a stop state.

5. The image reading apparatus according to claim 2, wherein the acceleration and deceleration profile is an n-th degree polynomial, where n is an integer of 2 or more.

6. The image reading apparatus according to claim 2, wherein the acceleration and deceleration profile is an n-th degree polynomial, where n is an integer of 3 or more.

7. The image reading apparatus according to claim 2, wherein
the image reading apparatus is a scanner,
the image reading unit is an image sensor, and
the target is the image sensor.

8. The image reading apparatus according to claim 7, wherein the image reading unit suppresses start of the image reading in acceleration of the target.

9. The image reading apparatus according to claim 2, wherein
the image reading apparatus is an ADF,
the image reading unit performs the image reading on a document, and
the target is the document.

10. The image reading apparatus according to claim 9, wherein
the document is one of a plurality of documents, and
the image reading unit completes the image reading on the plurality of documents while the drive unit is maintaining the target at a constant speed state.

11. A non-transitory computer-readable storage medium storing a program, the program configured to cause a computer to function as respective units of the image reading apparatus according to claim 1.

* * * * *